Oct. 11, 1966 M. L. NELSON Re. 26,101
ICE MAKING APPARATUS
Original Filed Oct. 1, 1959
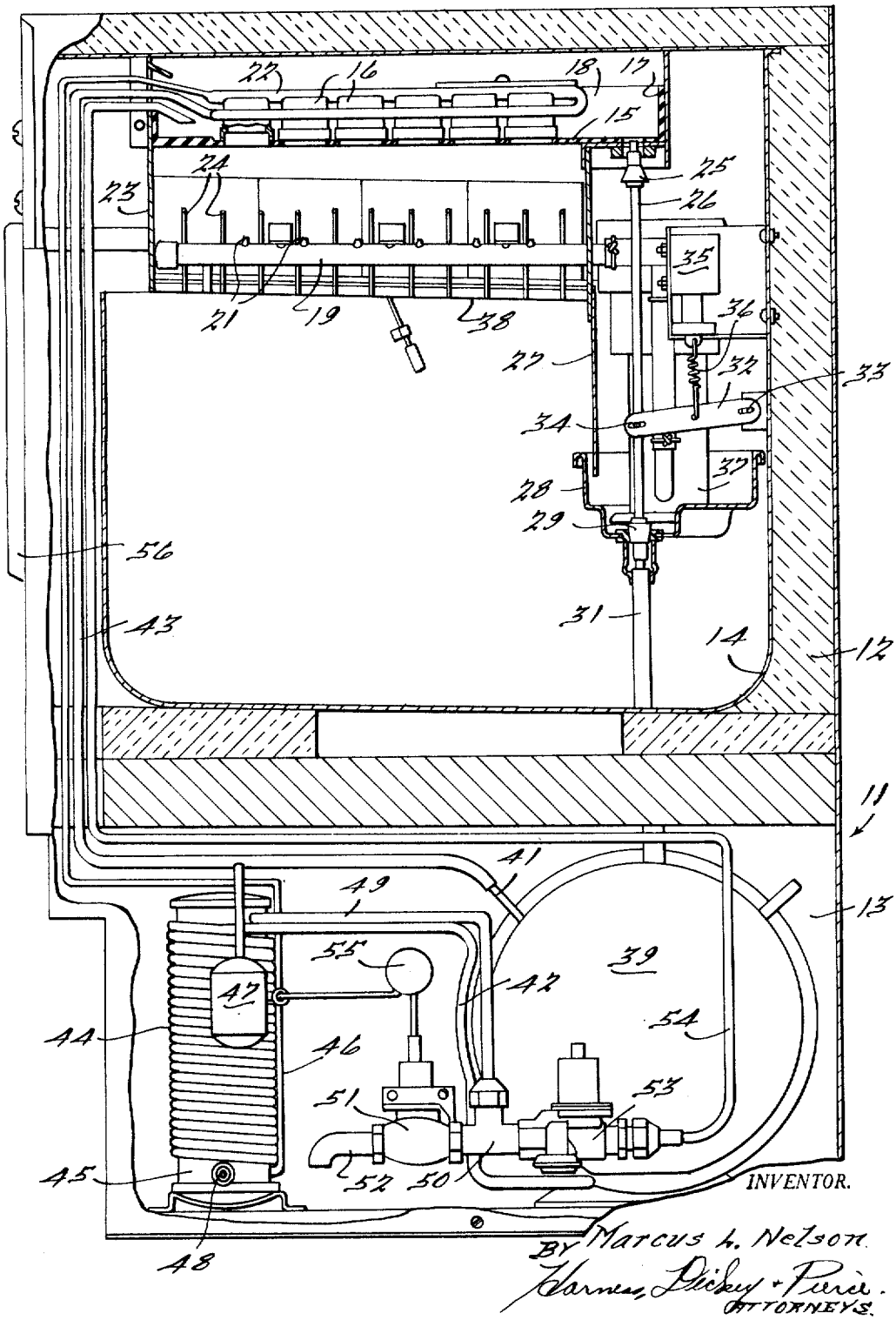
INVENTOR.
BY Marcus L. Nelson
Harness, Dickey & Pierce.
ATTORNEYS.

United States Patent Office

Re. 26,101
Reissued Oct. 11, 1966

26,101
ICE MAKING APPARATUS

Marcus L. Nelson, Albert Lea, Minn., assignor to King-Seeley Thermos Co., a corporation of Michigan Original No. 3,048,988, dated Aug. 14, 1962, Ser. No. 843,813, Oct. 1, 1959. Application for reissue Aug. 12, 1964, Ser. No. 402,673
12 Claims. (Cl. 62—347)

Matter enclosed in heavy brackets [ ] appears in the original patent but forms no part of this reissue specification; matter printed in italics indicates the additions made by reissue.

This invention relates to ice-making apparatus, and more particularly to constructions for the formation of ice by means of inverted molds provided with spray nozzles.

It is an object of the invention to provide a novel and improved ice-making machine of this character which eliminates the need for electric heater elements, switches or other circuitry for the maintenance of warm thawing water used in such machines.

It is another object to provide an improved ice cube maker of this type which permits the use of ordinary city water pressure for raising the warm water to the mold level, thus eliminating the need for pumps or similar equipment for this purpose.

Other objects, features, and advantages of the present invention will become apparent from the subsequent description, taken in conjunction with the accompanying drawings.

In the drawings, the figure is a partially schematic side elevational view showing an ice cube making machine incorporating the principles of the invention.

In general terms, the invention comprises a novel arrangement incorporated in an ice cube making machine of the inverted cup type which utilizes upwardly directed sprays beneath the cups for forming the cubes. This type of unit includes a warm water basin surrounding the inverted cups, which is filled with thawing water after the freezing portion of the cycle has been completed. The ice cubes drop out of the cups into a chute during the harvest portion of the cycle, after which the thawing water is transferred to a sump tank to be used for supplying the spray nozzles during the next freezing cycle.

According to the invention, a closed tank is provided below the mold for warming the thawing water, this tank being enclosed within a spirally-shaped condenser in the refrigerating system. The condenser thus serves to warm the water during the harvest portion of the cycle as the water flows from the tank to the thawing basin. Since a closed tank is thus provided for the warm water, the latter may be forced upwardly into the thawing basin by available city water pressure applied to the tank. After the harvest portion of the cycle has been completed, the connection between the tank and warming basin is closed and a drain connection is opened to the tank, so that the continued flow of water through the tank will serve to cool the condenser during the freezing portion of the cycle.

Referring more particularly to the drawing, the ice cube maker is generally indicated at 11 and comprises an insulated cabinet 12 having a lower compartment 13 for enclosing the main refrigerating and water warming components, and an upper compartment which has a storage bin 14 for the ice cubes and the ice forming and water flow components of the system.

A rubber tray 15 is disposed at the upper end of cabinet 12 and has a plurality of inverted ice cube forming cups 16, an upwardly extending flange or wall 17 surrounding these cups and forming a warm water compartment 18. A tube 19 extends horizontally below cups 16 and has a plurality of upwardly facing ports 21 adapted to spray water into cups 16 to form the ice cubes. A refrigerating coil or evaporator 22 surrounds cups 16 so as to form the ice when water is sprayed into the cups from ports 21. A return pan 23 is disposed below tray 15 and has a plurality of chutes 24 for guiding the ice cubes into storage bin 14.

A warm water drain valve 25 is provided in the floor of tray 15, this valve being secured to a post 26 which extends downwardly past a deflector plate 27 and through a sump tank 28. The lower end of rod 26 carries a sump tank drain valve 29 which leads to a drainpipe 31. The relative positions of valves 25 and 29 are such that when one valve is closed the other will be open. The valve positions are collected by a lever 32 pivoted at 33 to the interior of cabinet 12 and connected by a pin and slot connection 34 to an intermediate portion of rod 26. Lever 32 is controlled by a solenoid 35 through a spring 36. When solenoid 35 is energized, valve 25 will be closed and valve 29 opened, but when the solenoid is deenergized the weight of the parts will cause valve 25 to open and valve 29 to close. A sump pump 37 has an inlet connected to sump tank 28 and an outlet connected to spray tube 19. The floor 38 of return pan 23 slopes downwardly toward deflector 27 so that water will drain into sump tank 28.

The refrigerating circuit comprises a compressor 39 located in chamber 13 and having an inlet conduit 41 and an outlet conduit 42. Inlet conduit 41 is connected by an upwardly extending line 43 to one side of evaporator 22. Outlet conduit 42 of the compressor leads to a condenser 44 which comprises a single continuous spirally wound tube, conduit 42 leading to the upper end of this tube. Condenser 44, in accordance with the novel principles of this invention, surrounds a water warming tank 45. The connections to tank 45 are described below, but the tank itself is of closed cylindrical shape and the outer surface thereof is in heat-conductive relation with the spiral tube comprising condenser 44, so that the heat given up by the condenser will be transmitted to the water contained within tank 45. The tank is preferably supported in an upright position within lower chamber 13 of unit 11. The lower end of condenser 44 leads to an upwardly extending conduit 46 which is connected to evaporator 22. The refrigerating system may have other conventional elements such as a refrigerant dryer 47 which need not be described in detail.

The lower end of tank 45 has an inlet port 48 which may be connected to a source of city water pressure. The tank is completely enclosed, and an outlet conduit 49 is connected to the upper end and leads downwardly to a T-connection 50. One side of this T-connection leads to a head pressure control valve 51, the other side of this valve leading to a drain port 52. The other side of the T-connection leads to a solenoid-controlled metering valve 53 which has a conduit 54 leading upwardly from its outlet to the upper portion of unit 11, where it leads into chamber 18 of tray 15.

In operation of the unit, assuming an initial condition in which inverted cups 16 are empty, sump tank 28 contains water and water inlet pressure is connected to tank 45, a freezing cycle may be started by initiating operation of compressor 39. At this time, valves 25 and 29 will be in the position shown in the figure, with valve 29 closed and valve 25 open. When compressor 39 is started, refrigerant will be forced through line 42, condenser 44, line 46, evaporator 22 and line 43 back to the compressor. At the same time, sump pump 37 will be started so that water from sump tank 28 is sprayed upwardly through spray openings 21 into inverted cups 16. Ice cubes will begin to form in these cups, the excess water flowing downwardly through return pan 23 to sump tank 28. During this time, water inlet pressure will be applied to port 48 and tank 45 will be filled with water. Valve 51 will be opened to drain 52 and valve 53 closed, so that this water will flow from the tank through line 49 to the drain. The water will thus serve to cool condenser 44.

When ice cubes have been formed, at a time which may be controlled by a temperature-sensitive or timing device, the freezing portion of the cycle will be stopped and the harvest portion of the cycle will be started. During the harvest portion of the cycle, valve 51 will be closed, for example by a bellows unit 55 responsive to a change in refrigerant pressure in line 46, and valve 53 opened an amount sufficient to permit the proper flow of water to chamber 18 surrounding cups 16. This water should be enough to form the next batch of cubes as latter described. Compressor 39 will be stopped and the water flowing through tank 45 will be warmed by the condenser, this water being forced upwardly by the supply pressure applied to port 48 without any additional pumping means being needed. Valve 25 will be closed and valve 29 opened by solenoid 35. Opening of valve 29 will permit the excess water, which will ordinarily contain impurities, to be drained out. Closing of valve 25 will permit warm water to collect in chamber 18, thus thawing the outer surfaces of the ice cubes formed in cups 16 and permitting them to drop through chutes 24 into storage bin 14, from where they can be removed through door 56.

After the harvest portion of the cycle has been completed, another freezing cycle may be started by returning the parts to the positions previously described. The warm water collected in chamber 18 will then flow downwardly into sump tank 28 where it may be used for forming the next batch of ice cubes.

It will thus be seen that a novel and efficient ice cube making apparatus has been provided in which the heat released from the condenser in the refrigerant system is utilized to warm the thawing water, the water system having the further function of cooling the condenser during the freezing portion of the cycle. Because of the closed nature of the water system, ordinary city water pressure is sufficient to raise the thawing water to the upper level of the unit to be used in releasing the ice cubes.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In an ice-forming apparatus, a form for receiving water to be frozen, a refrigerating system including an evaporator adjacent said from, means for retaining thawing water adjacent said form, a *single* closed tank for said thawing water having an inlet adapted to be connected to a source of city water pressure, an outlet conduit leading from said tank to said thawing water retaining means adjacent the ice form, *means for receiving thawing water from said thawing water retaining means, means for communicating thawing water from said thawing water retaining means to said last mentioned means, means for communicating thawing water from the said last mentioned means to said form,* and a condenser in said refrigerating system in direct heat-conducting relation with said tank, *whereby the water in said tank will become heated by said condenser* [the rate of heat loss from said condenser being proportional to the rate of water flow through said tank] *and means to provide a continuous flow of water through said closed tank.*

[2. In an ice-forming apparatus, a tray having an inverted ice form and a chamber surrounding the outer surface of said form for retaining thawing water, a refrigerating system having a compressor and an evaporator, a closed thawing water tank below said form, an inlet port for said tank adapted to be connected to a source of city water pressure, an outlet conduit leading from said tank to said thawing water chamber, and a condenser in said refrigerating system surrounding said tank in direct heat-conducting relation therewith, the rate of heat loss from said condenser being proportional to the rate of water flow through said tank.]

[3. The combination according to claim 2, further provided with a drain connection for said thawing water tank outlet conduit, and means for selectively connecting said outlet conduit either to said drain connection or to said thawing water chamber.]

4. In an ice-making apparatus, a cabinet, an ice form in the upper portion of said cabinet, a thawing water chamber surrounding said ice form, a sump tank, a selectively operable drain connection leading from said thawing water chamber to said sump tank, means for directing water toward the inside of said form, a sump pump for delivering water from said sump tank to said water directing means, a refrigerating system having a compressor in the lower portion of said cabinet and an evaporator adjacent said ice form, a closed thawing water tank in the lower portion of said cabinet, said thawing water tank having an inlet connection adapted to be connected to city water pressure and an outlet conduit, a first connection leading from said outlet conduit to drain, a second connection leading upwardly from said outlet conduit to said thawing water chamber, means for selectively opening and closing said first and second connections, and a condenser in said refrigerating system, said condenser surrounding said thawing water tank in heat-conducting relation therewith.

5. In an ice cube forming apparatus, a cabinet having upper and lower compartments, a tray in the upper compartment of said cabinet, said tray having a plurality of inverted cups and a wall surrounding said cups to form a thawing water chamber, a plurality of spray nozzles disposed below said tray and directed toward said cups, a refrigerating system having a compressor in the lower compartment of said cabinet and evaporator adjacent said inverted cups, a closed thawing water tank in said lower compartment having an inlet port adapted to be connected to city water pressure and an outlet port, a first conduit leading from said outlet port to drain, a second conduit leading from said outlet port to said thawing water chamber, and means for selectively opening and closing either of said conduits.

6. In an ice cube making apparatus, a cabinet having upper and lower compartments, an ice cube form in said upper compartment having a plurality of inverted cup-shaped forming elements and a wall surrounding said elements to form a thawing water chamber, a storage bin in said upper compartment for receiving ice cubes, a tube having a plurality of spray nozzles directed upwardly at said inverted cup-shaped elements, a sump tank, a sump pump for delivering water from said sump tank to said tube, a drain valve for said sump tank, a valve connecting said thawing water chamber with said sump tank, a return pan for returning excess water delivered from said tube to said sump tank, a refrigerating system comprising a compressor in said lower compartment and an evaporator adjacent said form, a closed thawing water tank in said lower compartment, an inlet port for said thawing water tank adapted to be connected to city water pressure, an outlet conduit leading from said thawing water tank, a drain line leading from said outlet conduit having a drain valve therein, and a thawing water line leading from said outlet conduit to said thawing water chamber and having a metering valve therein.

7. The combination according to claim 6, further provided with a condenser in said refrigerating system in heat-conducting relation with said thawing water tank.

8. In an ice-forming apparatus, a form for receiving water to be frozen, a refrigerating system including an evaporator adjacent said form, means for retaining thawing water adjacent said form, *a single closed tank* [holding means] for said thawing water having an inlet, an outlet conduit leading from said [holding means] *tank* to said thawing water retaining means adjacent the ice form, *drain connection means for said tank, means for selectively connecting said outlet conduit either to said drain connection means or to said thawing water chamber, means for receiving thawing water from said thawing water retaining means, means for communicating thawing water from said thawing water retaining means to said last mentioned means, means for communicating thawing water from the said last mentioned means to said form,* [and] a condenser in said refrigerating system in direct heat-conducting relation with said [holding means] *tank, whereby a quantity of water in said holding means will become heated by said condenser, and means for communicating the same quantity of water to said thawing water retaining means* [the rate of heat loss from said condenser being proportional to the rate of water flow through said holding means.]

9. In an ice cube forming apparatus, a cabinet having upper and lower compartments, a tray in the upper compartment of said cabinet, said tray having a plurality of inverted cups and a wall surrounding said cups to form a thawing water chamber, a plurality of spray nozzles disposed below said tray and directed toward said cups, a refrigerating system having a condenser, a compressor in the lower compartment of said cabinet and an evaporator adjacent said inverted cups, thawing water carrying means in heat-conducting relation with said condenser and having an inlet port adapted to be connected to city water pressure and an outlet port, a first conduit leading from said outlet port to drain, a second conduit leading from said outlet port to said thawing water chamber, and means for selectively opening and closing either of said conduits.

[10. The combination according to claim 8, further provided with a sump tank, a drain connection leading from said thawing water retaining means to said sump tank, and a sump pump for delivering water from said sump tank to the inside of said form.]

*11. In an ice-making apparatus, an ice form, a thawing water chamber adjacent said form, a sump chamber, a thawing water tank, an outlet conduit leading from said tank to said thawing water chamber means for directing water from said sump chamber toward said form, conduit means for communicating a single source of water at city water pressure to said thawing water chamber and to said sump chamber, conduit means for communicating thawing water from said thawing water chamber to said sump chamber whereby the thawing water may be directed toward said form, drain connection means for said tank, means for selectively connecting said outlet conduit either to said drain connection means or to said thawing water chamber and a refrigeration system having a condenser arranged in direct heat-conducting relation with the water communicated through said conduit means to said thawing water chamber and means to provide a continuous flow of water through said closed tank.*

*12. In an ice forming apparatus, an ice form, a thawing water chamber adjacent said ice form, a sump, means for directing water from said sump toward said ice form, an outlet conduit leading from said tank to said thawing water chamber, drain connection means for said tank, means for selectively connecting said outlet conduit either to said drain connection means or to said thawing water chamber, a refrigerating system, a thawing water tank, conduit means for communicating a water source with said thawing water tank and for communicating said thawing water tank with said thawing water chamber, said ice form and said sump being arranged such that the water thawing ice in said form is communicated directly to said sump for delivery to said form during the subsequent freezing cycle of said refrigeration system.*

*13. In an ice-forming apparatus, a tray having an inverted ice form and a chamber surrounding the outer surface of said form for retaining thawing water, means for receiving thawing water from said chamber, means for communicating thawing water from said last mentioned means to said form, a refrigerating system having a compressor and an evaporator, a closed thawing water tank, an inlet port for said tank adapted to be connected to a source of city water pressure, an outlet conduit leading from said tank to said thawing water chamber, drain connection means for such thawing water tank, means for selectively connecting said outlet conduit either to said drain connection means or to said chamber and a condenser in said refrigerating system surrounding said tank in direct heat-conducting relation therewith.*

*14. In an ice-making apparatus, a cabinet, an ice form in said cabinet, a thawing water chamber surrounding said ice form, a sump tank, a selectively operable drain connection leading from said thawing water chamber to said sump tank, means for directing water toward the inside of said form, a sump pump for delivering water from said sump tank to said water directing means, a refrigerating system having a compressor in said cabinet and an evaporator adjacent said ice form, a closed thawing water tank in said cabinet, said thawing water tank having an inlet connection adapted to be connected to city water pressure and an outlet conduit, a first connection leading from said outlet conduit to drain; a second connection leading from said outlet conduit to said thawing water chamber, means for selectively opening and closing said first and second connections, and a condenser in said refrigerating system, said condenser surrounding said thawing water tank in heat-conducting relation therewith.*

*15. In an ice-forming apparatus, a tray having an inverted ice form and a chamber adjacent the outer surface of said form for retaining thawing water, a refrigerating system having a compressor and an evaporator, a closed thawing water tank below said form, an inlet port for said tank adapted to be connected to a source of a city water pressure, an outlet conduit leading from said tank to said thawing water chamber, a drain connection means for said thawing water tank outlet conduit, means for selectively connecting said outlet conduit either to said drain connection means or to said thawing water chamber, means for receiving thawing water from said thawing water retaining means, means for communicating thawing water from said thawing water retaining means to said last mentioned means, means for communicating thawing water from the said last mentioned means to said form, and a condenser in said refrigerating system surrounding said tank in direct heat-conducting relation therewith.*

References Cited by the Examiner

The following references, cited by the Examiner, are of record in the patented file of this patent or the original patent.

UNITED STATES PATENTS

| | | | |
|---|---|---|---|
| 634,350 | 10/1899 | Hutchinson. | |
| 1,448,584 | 3/1923 | Willard. | |
| 2,569,113 | 9/1951 | Munshower | 62—344 X |
| 2,605,620 | 8/1952 | Taylor | 165—169 |
| 2,674,858 | 4/1954 | Magnuson et al. | 62—348 X |
| 2,722,110 | 11/1955 | Denzer | 62—347 |
| 2,729,070 | 1/1956 | Ames | 62—347 |
| 2,891,387 | 6/1959 | Cocanour | 62—344 X |
| 2,892,323 | 6/1959 | Woodmark. | |
| 2,907,183 | 10/1959 | Roberts. | |
| 2,949,019 | 8/1960 | Roberts | 62—349 X |

ROBERT A. O'LEARY, *Primary Examiner.*

W. E. WAYNER, *Assistant Examiner.*